United States Patent [19]

Mori

[11] 4,445,498

[45] May 1, 1984

[54] SUPPORT ARM FOR A SUNLIGHT CONCENTRATING AND COLLECTING APPARATUS

[76] Inventor: Kei Mori, 3-16-3-501, Kaminoge, Setagaya-ku, Tokyo, Japan

[21] Appl. No.: 412,206

[22] Filed: Aug. 27, 1982

[30] Foreign Application Priority Data

Aug. 31, 1981 [JP] Japan .................................. 56-136293

[51] Int. Cl.³ ............................................. F24J 3/02
[52] U.S. Cl. ..................................... 126/424; 126/440
[58] Field of Search .............. 126/424, 425, 440, 450, 126/451; 248/317, 323, 324; 250/203 R, 491.1; 350/245; 353/3

[56] References Cited

U.S. PATENT DOCUMENTS

| | | | |
|---|---|---|---|
| 1,220,091 | 3/1917 | Goff | 126/440 |
| 1,683,266 | 9/1928 | Shipman | 126/440 |
| 2,902,028 | 9/1959 | Manly | 126/440 |
| 3,965,683 | 6/1976 | Dix | 126/440 |
| 4,026,267 | 5/1977 | Coleman | 126/440 |
| 4,188,941 | 2/1980 | Hopkins | 126/440 |
| 4,205,661 | 6/1980 | Chapman | 250/491 |
| 4,282,858 | 8/1981 | Bowers | 126/440 |
| 4,325,788 | 4/1982 | Snyder | 250/203 R |
| 4,343,295 | 8/1982 | Dubicki | 126/440 |
| 4,352,350 | 10/1982 | Johnson | 353/3 |
| 4,354,348 | 10/1982 | Lee | 126/440 |
| 4,355,628 | 10/1982 | Watts | 126/450 |
| 4,387,702 | 6/1983 | Murphy | 126/424 |

*Primary Examiner*—Daniel J. O'Connor
*Attorney, Agent, or Firm*—Merchant, Gould, Smith, Edell, Welter & Schmidt

[57] ABSTRACT

A support arm for a sunlight concentrating and collecting apparatus of a large size. In such an apparatus, a heavy weight is applied to the support arm. Thus, the support arm becomes large in weight. On the other hand, the mass of the support arm must be minimized so as to track the sun's movement very quickly and smoothly. The support arm is provided with a first member having a curved plate formed substantially in the shape of circular arc, and a second member having an inverted saddle-shaped plate or plates, the second member being firmly fixed along the outer surface of the first member.

8 Claims, 10 Drawing Figures

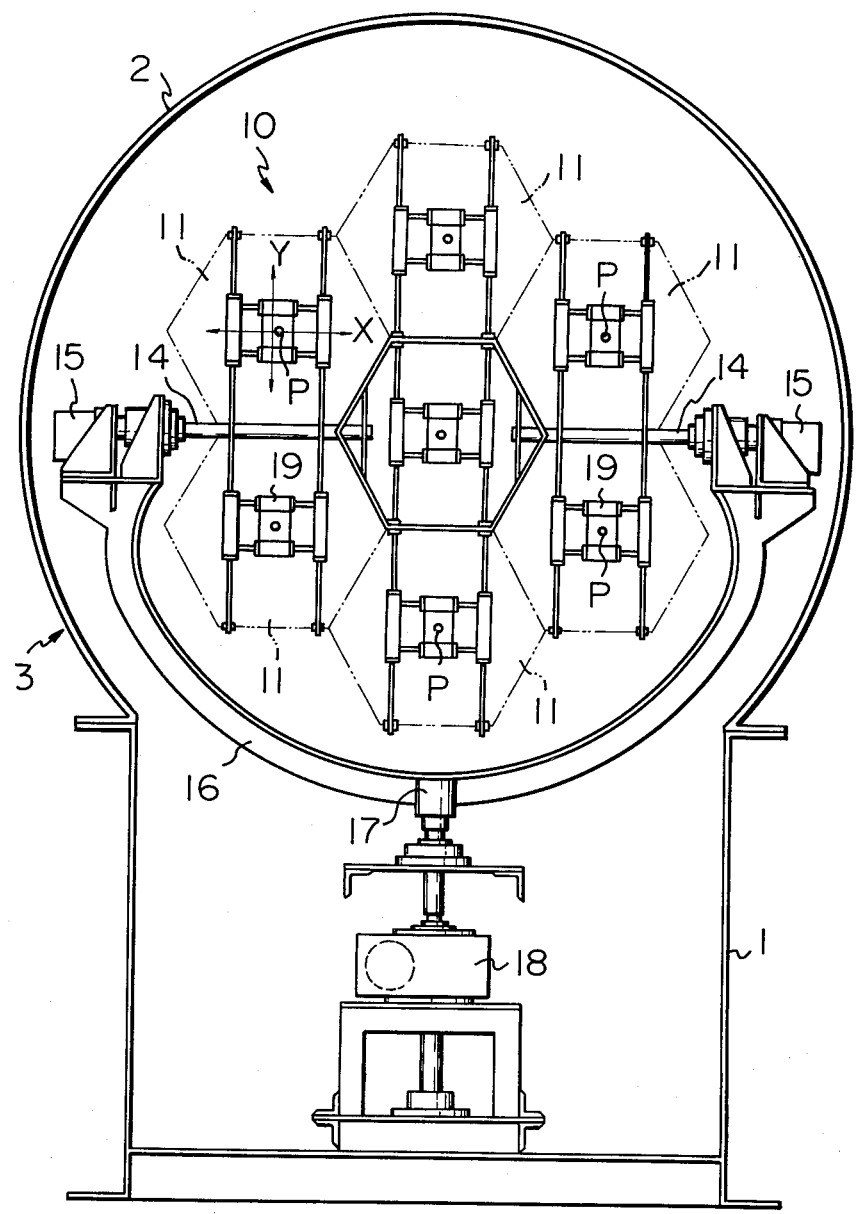

SUPPORT ARM FOR A SUNLIGHT CONCENTRATING AND COLLECTING APPARATUS

FIELD OF THE INVENTION

The present invention relates to the utilization of solar energy. More particularly, the present invention relates to a support arm suitable for a large-size sunlight concentrating and collecting apparatus.

SUMMARY OF THE INVENTION

Many technical ideas have been proposed for the use of solar energy as a source of illumination or electricity. One group of ideas call for sunlight to be concentrated by means of a lens or the like and then to be guided into a light conductor cable for transmission to another location for illumination or the like.

To effectively guide the sunlight into the light conductor cable, it is necessary to control a light receiving plane of the lens to continuously and precisely track the sun's movement. For this purpose, in the prior sunlight concentrating and collecting apparatus, the lens is mounted so as to be rotatable around two perpendicularly intersecting axes. One axis is the horizontal axis of a first rotatable shaft. The other axis is the vertical axis of a second rotatable shaft. In a sunlight concentrating and collecting apparatus previously proposed by the same applicant as this invention, the lens is fixed on the first rotatable shaft. The ends of the first rotatable shaft are supported by a single support arm, which in turn is supported by the second rotatable shaft.

In modern large-sized sunlight concentrating and collecting apparatuses, a large numbers of lenses is preferable. The increased number of lenses, however, increases the load applied to the support arm. To bear this increased load, the support arm must be made stronger and thus becomes heavier. This presents a problem in that the gyrating mass of the support arm must be minimized to ensure quick and smooth operation of tracking the sun's movement.

The invention as claimed is intended to overcome the aforementioned defect of the prior technique. According to the present invention, there is provided a first member having a curved plate formed substantially in the shape of circular arc and a second member having an inverted saddle-shaped plate or plates. Said second member is firmly fixed along the outer surface of said first member. It lies on at least one plane containing the axis of the first rotatable shaft and is symmetrical with respect to the neutral plane of said first member.

The advantages offered by the present invention are that the apparatus can be constructed to be light in weight and large in mechanical strength in both the vertical and horizontal directions. Thus, the apparatus can track the sun's movement rapidly and smoothly.

BRIEF DESCRIPTION OF THE DRAWINGS

The invention will be more fully understood from the following detailed description taken in conjunction with the accompanying drawings, in which:

FIG. 2 is an enlarged rear view of the sunlight concentrating and collecting apparatus shown in FIG. 1;

FIGS. 3A, 3B, and 3C are drawings illustrating one embodiment of the support arm for a sunlight concentrating and collecting apparatus according to the present invention, in which FIG. 3A is a front view, FIG. 3B is a side view taken along line H—H of FIG. 3A, and FIG. 3C is a plan view taken along line V—V of FIG. 3A;

FIGS. 4A, 4B, and 4C are drawings illustrating another embodiment of the support arm according to the present invention, in which FIG. 4A is a front view, FIG. 4B is a side view taken along line H—H of FIG. 4A, and FIG. 4C is a plan view taken along line V—V of FIG. 4A;

DETAILED DESCRIPTION OF THE INVENTION

Figure 1:
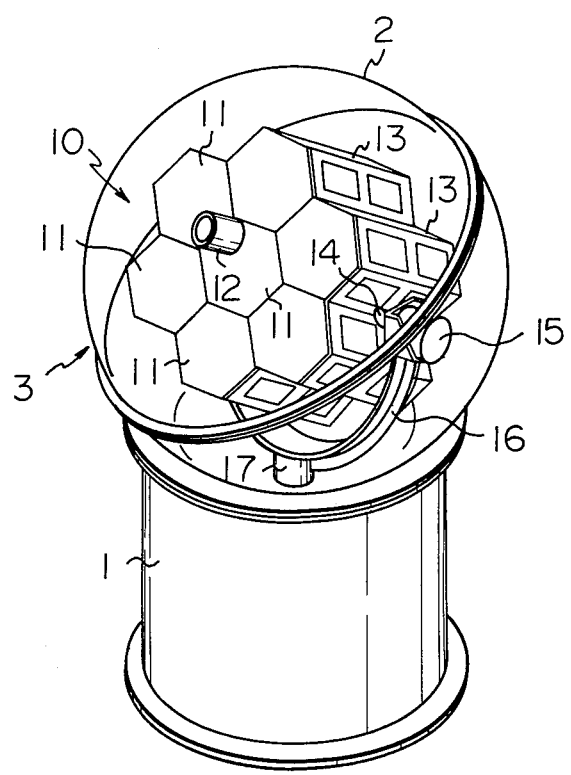
FIG. 1 is a general perspective view diagrammatically illustrating the structure of one embodiment of a sunlight concentrating and collecting apparatus to which a support arm according to the present invention is applied.

FIG. 1 is a general perspective view showing one embodiment of a sunlight concentrating and collecting apparatus to which a support arm according to the present invention is applied. FIG. 2 is an enlarged rear view of the sunlight concentrating and collecting apparatus shown in FIG. 1.

Referring to FIGS. 1 and 2, there is shown a capsule 3 comprised of a hollow cylindrical base member 1 and a transparent head portion 2 formed in the shape of a sphere or dome and mounted on the base member 1. In use, the capsule 3 encloses a sunlight concentrating and collecting apparatus 10 therewithin.

The apparatus 10 includes a plurality of lenses 11, e.g., 7 or 19 in number, integrally connected with each other for concentrating sunlight; a solar direction sensor 12 for detecting the sun's position; holding frames 13 integrally holding the lenses 11 and solar direction sensor 12; a first rotatable shaft (horizontal shaft) 14 for turning holding frames 13; first electric motors 15 for driving the first rotatable shaft 14; a support arm 16 for supporting the lenses 11, solar direction sensor 12, holding frames 13, first rotatable shaft 14, and first electric motors 15; a second rotatable shaft (vertical shaft) 17 disposed perpendicular to the first rotatable shaft 14; and a second electric motor 18 (see FIG. 2) for driving the second rotatable shaft 17.

In operation, the solar direction sensor 12 detects the sun's position. The output signals are used to control the first and second motors 15 and 18 as keep the lenses 11 continuously tracking the sun's movement.

The sunlight concentrated by lenses 11 is introduced into light conductor cables (not shown) or the like whose inlet ends are disposed at the focal points of each of the lenses 11. The sunlight is then propagated through the light conductor cables to any desired place, for example, to a place where illumination is desired.

In FIG. 2, reference numerals 19 indicate adjusting means for keeping the light receiving ends of the light conductor cables at the focal points of the lenses 11. In practice, the light receiving ends of the light conductor cables are fixed to the points P of the adjusting means 19. For adjustment the above adjusting means 19 can be moved in the X and Y directions to bring the light receiving ends of the light conductor cables to the focal points of the lenses 11.

In the above-mentioned sunlight concentrating and collecting apparatus, the increased number of lens also increases the vertical and horizontal loads applied to the support arm 16. Thus, support arm 16 must also be strengthened and thus increased in weight to support this increased vertical and horizontal loads. On the other hand, since the support arm 16 is rotated by the motor 18 through the second rotatable shaft 17, the gyrating mass of the support arm 16 must be reduced as much as possible to ensure quick and smooth operation of automatic tracking of the sun's movement.

Under such background the present applicant made researches and completed the present invention.

Figure 3A:
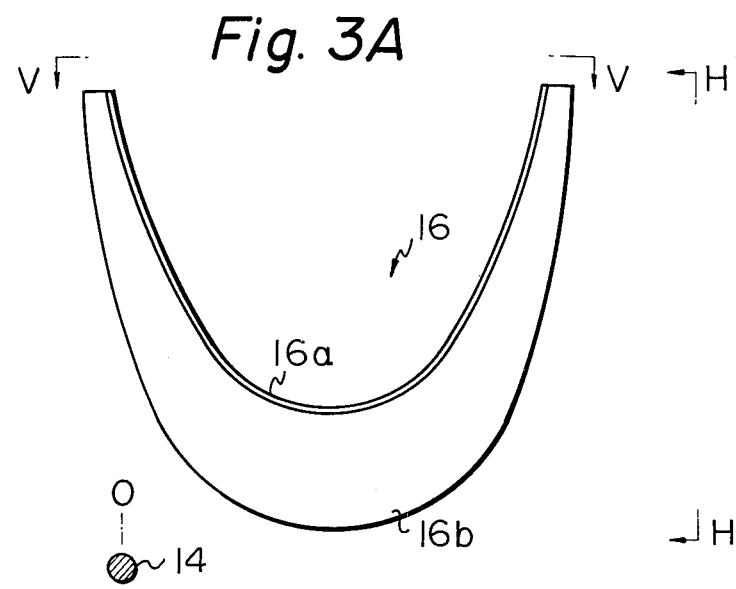
Figure 3B:
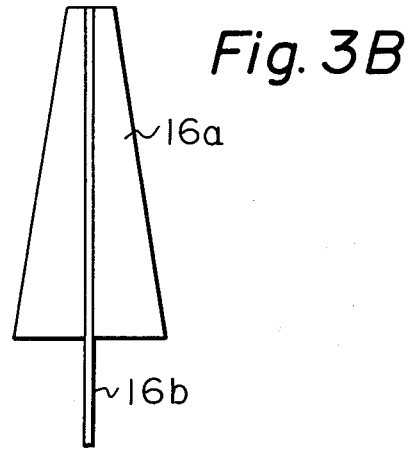
Figure 3C:
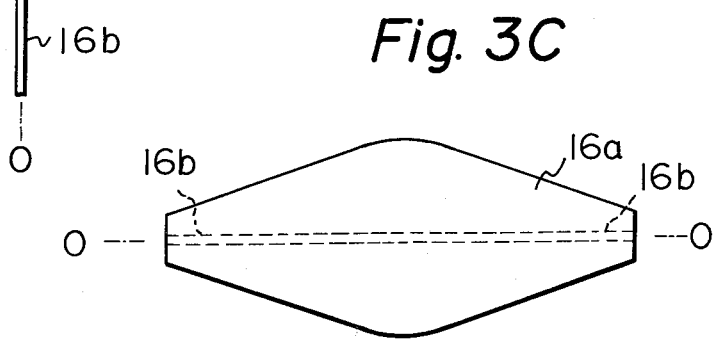

FIG. 3A is a front view showing one embodiment of the support arm 16 according to the present invention; FIG. 3B is a side view taken along line H—H of FIG. 3A; and FIG. 3C is a plan view taken along line V—V of FIG. 3A.

As shown in FIG. 3A, the support arm 16 is constructed with a first member 16a having a curved plate formed substantially in the shape of circular arc and a second member 16b having an inverted saddle-shaped plate. The second member 16b is firmly fixed along the outer or convexed surface of the first member 16a by any suitable means, for example, by welding and lies on the plane containing the axis of the first rotatable shaft 14 and also passes through the neutral plane O—O of the first member 16a.

Figure 4A:
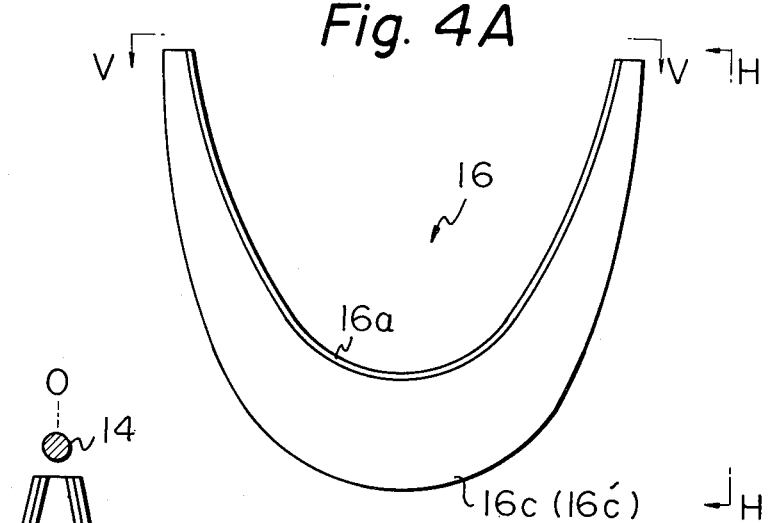
Figure 4B:
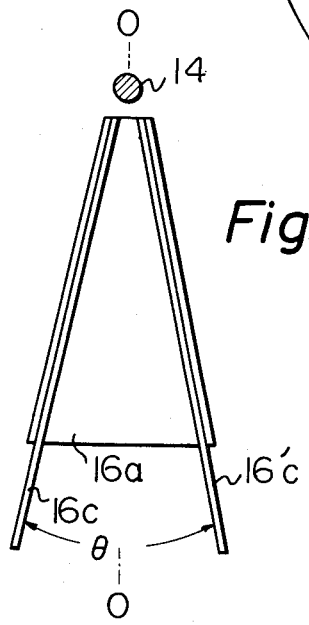
Figure 4C:
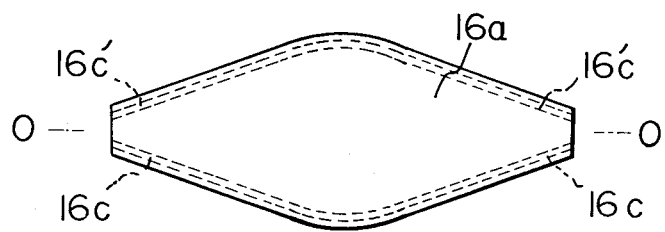

FIG. 4A is a front view showing another embodiment of the support arm 16 according to the present invention; FIG. 4B is a side view taken along line H—H of FIG. 4A; and FIG. 4C is a plan view taken along line V—V of FIG. 4A.

In FIG. 4, the support arm 16 is provided with two second members 16c and 16c'. In another embodiment, the second members 16c and 16c' lie on two different planes containing the axis of the first rotatable shaft 14. They also pass through planes which are symmetrical with respect to the neutral plane O—O of the first member 16a.

In such a case, formation of the first member 16a to have side surfaces coinciding with planes containing the axis of the first rotatable shaft 14 and then firmly fixing the second members 16c and 16c' aligned with said side surfaces will automatically position the second members 16c and 16c' at the above-mentioned relations. This facilitates the positioning of the second members 16c and 16c' along the planes and enables easy manufacturing of the support arm 16.

As shown in FIGS. 3A and 4A, the first member 16a is formed so that the width thereof becomes narrower from the middle to the ends.

With the above-mentioned construction, the vertical load applied to the first rotatable shaft 14 can be supported by the second member 16b or the second members 16c and 16c'. Thus, the mechanical strength per unit length of the second member or members becomes uniform over the entire length thereof. This allows the required area of the second member or members, i.e., the mass thereof, to be minimized.

Since the second member 16b or members 16c and 16c' lie on each plane containing the axis of first rotatable shaft 14 and are symmetrical with respect to the neutral plane O—O of first member 16a, the vertical load applied to first rotatable shaft 14 may be supported by support arm 16 at a well balanced condition during turning.

As for the horizontal load applied to the first rotatable shaft 14 in the lateral direction to the axis thereof, as particularly shown in FIG. 4, said horizontal load can effectively be supported by the two second members 16c and 16c'. In such a case, the larger the angle $\Theta$ between the second members 16c and 16c', the larger the mechanical strength of the support arm 16.

Figure 5:
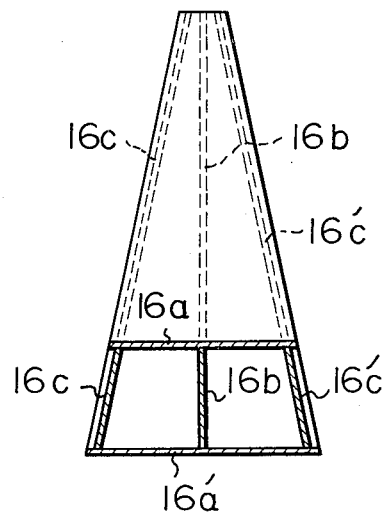
FIG. 5 is a sectional side elevation illustrating a further embodiment of the support arm according to the present invention.

FIG. 5 is a sectional side elevation illustrating a further embodiment of the support arm, wherein the support arm is provided with a further first member 16a' outside of the original first member 16a. In this embodiment, the two first members 16a and 16a' are firmly connected by above-mentioned second members 16b, 16c, and 16c'. It will easily be understood that the second member 16b or members 16c and 16c' may be selectively employed for this purpose.

Figure 6:
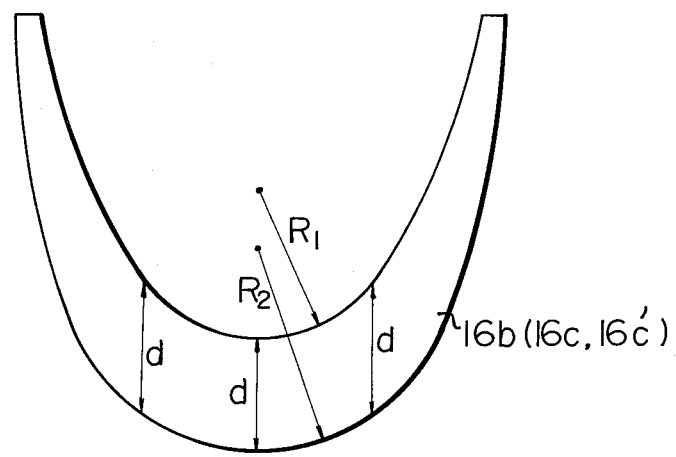
FIG. 6 is a diagram to assist the explanation of the shape of the second member of the support arm shown in FIG. 3.

FIG. 6 is a diagram to assist the explanation of the shape of the second member shown in FIG. 3.

As mentioned previously, the width of the middle portion is larger than that of the end portions. However, the lengths d, d . . . measured in the vertical direction are substantially equal. In the embodiment shown in FIG. 6, the radius $R_2$ of the outer contour is larger than the radius $R_1$ of the inner contour. However, these contours can be designed as $R_1=R_2$ (centers of two contours are offset with each other) or as $R_2>R_1$ (centers of two contours are registered with each other).

As will readily be understood from the foregoing description, according to the present invention, even when large vertical and horizontal loads are applied to the support arm, since the second member or members are disposed in a symmetrical relation with respect to the neutral plane of the first member, these loads can effectively be supported of the first member, these loads can effectively be supported by the support arm. Furthermore, there can be provided a sunlight concentrating and collecting apparatus which is constructed to be light in weight and large in mechanical strength in both the vertical and horizontal directions and which can track the sun's movement rapidly.

The invention has been described in detail with reference to preferred embodiments thereof, but it will be understood that reasonable variations and modifications are possible without departing from the spirit and scope of the invention. For example, if some increase in mass is allowable, the first member 16a of the support arm 16 can be made a rectangular shaped plate having a uniform width over the entire length thereof.

I claim:

1. A support arm for a sunlight concentrating and collecting apparatus, said apparatus enclosing a plurality of lenses integrally connected with each other, light conductor cables having light receiving ends thereof arranged at each focal point of said lenses, a first rotatable shaft for turning said integrated lenses around the horizontal axis, a support arm for rotatably supporting the ends of said first rotatable shaft, and a second rotatable shaft for turning said support arm around the vertical axis perpendicular to said horizontal axis, whereby the turning of said first and second shafts is controlled to cause said lenses to face the position of the sun so as to collect sunlight into said light conductor cables, characterized in that said support arm comprises a first member having a curved plate formed substantially in the shape of circular arc, a second member having an inverted saddle-shaped plate or plates, said second member being firmly fixed along the outer surface of said first member, and lies on at least one plane containing the axis of first rotatable shaft and is symmetrical with respect to the neutral plane of said first member.

2. A support arm as claimed in claim 1, in which the width of the middle portion of said second member is larger than that of the end portions.

3. A support arm as claimed in claim 1, in which the contour of said second member is constructed by two eccentric circles with the same radii.

4. A support arm as claimed in claim 1, in which the contour of said second member is constructed by two concentric circles with different radii.

5. A support arm as claimed in claim 1, in which the contour of said second member is constructed by two eccentric circles with different radii.

6. A support arm as claimed in any one of claims 1 through 5, in which the width of the middle portion of said first member is larger than that of the end portions.

7. A support arm as claimed in claim 6, in which said first member is formed so that both side surfaces coincide with planes containing the axis of the first rotatable shaft.

8. A support arm as claimed in any one of claims 1 through 5, further comprising another first member outside of and spaced from said original first member at a predetermined distance, said other first member being firmly fixed to said second member or members.

* * * * *